Aug. 4, 1942.  F. H. PRITCHARD  2,292,086
GEAR DRIVE AND LUBRICATION SYSTEM
Filed Oct. 29, 1940  2 Sheets-Sheet 1

Inventor:
Franklin H. Pritchard,
by Harry E. Dunham
His Attorney.

Aug. 4, 1942.   F. H. PRITCHARD   2,292,086
GEAR DRIVE AND LUBRICATION SYSTEM
Filed Oct. 29, 1940   2 Sheets-Sheet 2

Inventor:
Franklin H. Pritchard,
by Harry E. Dunham
His Attorney.

Patented Aug. 4, 1942

2,292,086

UNITED STATES PATENT OFFICE 2,292,086

GEAR DRIVE AND LUBRICATION SYSTEM

Franklin H. Pritchard, Erie, Pa., assignor to General Electric Company, a corporation of New York Application October 29, 1940, Serial No. 363,254

5 Claims. (Cl. 184—11)

My invention relates to gear drives and particularly to an improved construction for providing efficient lubrication to gear drives wherein the different gears are arranged in different vertical positions.

An object of my invention is to provide an improved gear driving construction provided with an efficient lubricating system.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 1:
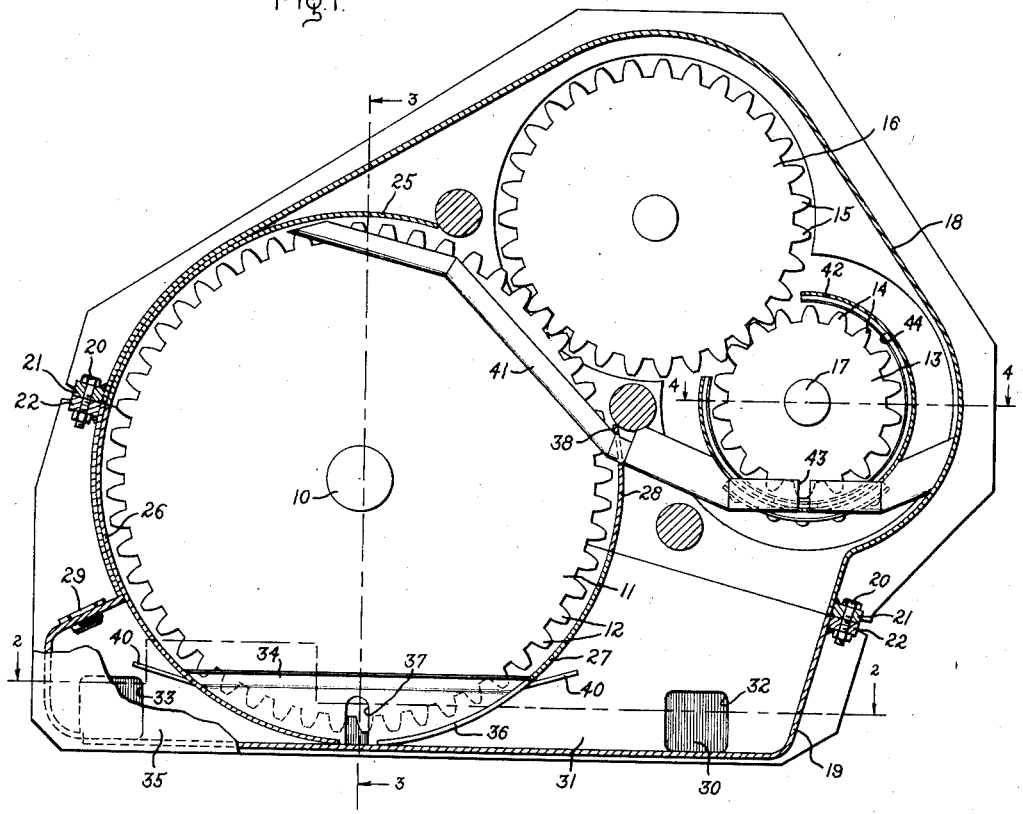
Figure 2:
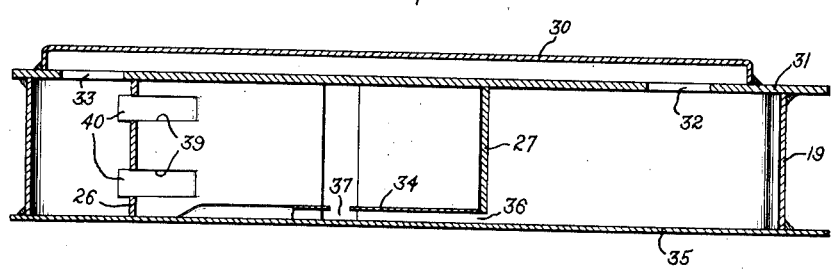
Figure 3:
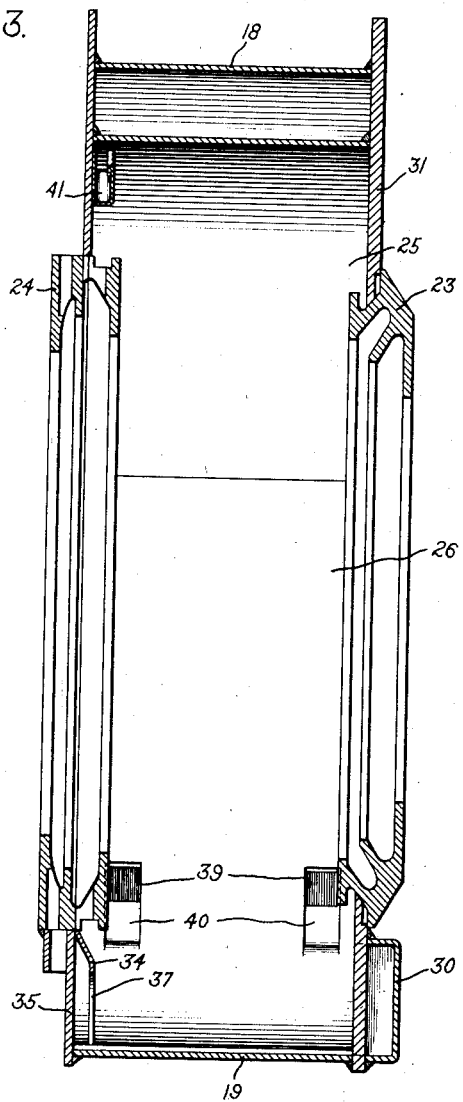
Figure 4:
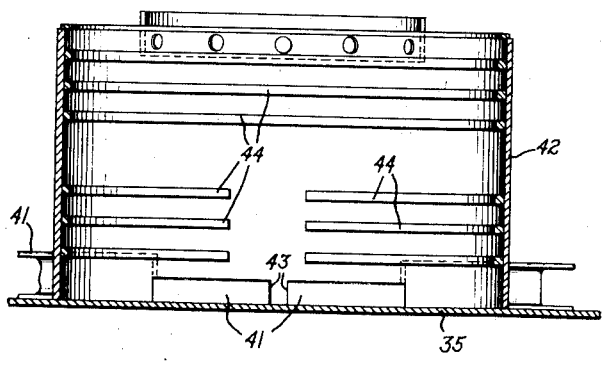

In the drawings, Fig. 1 is a side elevational view of an embodiment of my improved gear drive and lubricating arrangement with the major portion of an end wall of the gear casing broken away to illustrate the relative arrangement of the gears and associated lubricating system; Fig. 2 is a sectional view taken along line 2—2 of the gear casing shown in Fig. 1; Fig. 3 is a sectional view taken along line 3—3 of the gear casing shown in Fig. 1; and Fig. 4 is a sectional view taken along line 4—4 of the gear casing shown in Fig. 1.

Referring to the drawings, I have shown a railway vehicle driving axle 10 which is arranged to be driven by an axle gear 11 mounted directly on the axle 10. The gear 11 is provided with a plurality of gear teeth 12 on the outer periphery thereof and is arranged to be driven by a pinion driving gear 13 through an idler gear 16 having gear teeth 15 in engagement with the teeth 12 of the axle gear 11 and with teeth 14 of the pinion driving gear 13. The axle gear 11 is the largest of the gears, and the idler gear 16 and pinion gear 13 are arranged vertically higher than the axle gear to provide adequate space for the driving motor on the shaft 17 of which the pinion gear is mounted. A split gear casing including an upper wall section 18 and a lower wall section 19 is arranged about the gears in order to exclude foreign substances therefrom and to provide a lubricant reservoir for the gears. The upper and lower portions of the split gear casing are secured together by bolts 20 which extend through flanges 21 and 22 on the two halves of the gear casing. In order further to insure against the entrance of foreign substances and to minimize the passage of lubricant out of the gear casing, labyrinth sealing rings 23 and 24 are arranged on each side of the gear casing about the axle 10, as shown in Fig. 3. These rings are adapted to cooperate with complementary labyrinth sealing rings mounted upon the axle.

Since, as shown in Fig. 1, the idler gear 16 and the pinion gear 13 are mounted vertically higher than the axle gear 11, an arrangement is provided for supplying lubricant from the gear casing reservoir to the engaging surfaces of the teeth of these gears. In order to provide an efficient and simplified construction for supplying this lubricant, a baffle arrangement is provided about the axle gear 11 which includes baffle plates 25, 26, 27, and 28 which extend in close proximity about the outer periphery of the teeth 12 of the axle gear. The major lubricant reservoir for the gear drive is provided by the lower portion of the gear casing 19 which is adapted to be supplied with lubricant at one end thereof through an opening closed by a screw plug 29. Lubricant is supplied to the casing portion within the baffle from the portion adjacent the supply opening through a channel 30 which is welded to the outer side of plate 31 of the lower half of the gear casing 19 along the lower portion thereof, forming a passageway communicating with both ends of the lubricant reservoir portion of the gear casing 19 through openings 32 and 33 formed in the plate 31. The lubricant then enters the gear casing reservoir portion between the wall 19 and the baffle 27 and passes through an opening 36 in the baffle 27 into another passageway formed by an angle member 34 welded to the baffles 26 and 27 and to the other side wall plate 35 of the gear casing. Lubricant is fed from the passage in the member 34 through an opening 37 into the portion of the reservoir between the baffles 26 and 27, from which it is fed to the gear 11. As the axle gear 11 is rotated, the teeth 12 carry oil in the intertooth spaces and pump this oil over the upper edge 38 of the baffle plate 28, so that it will spill into the adjacent portion of the gear casing outside of the baffle arrangement about this gear. This will raise the lubricant level in the adjacent portion of the gear casing and lower the level of the lubricant within the baffle arrangement about this gear. This lubricant is returned to the gear 11 from the adjacent reservoir portion of the gear casing through the baffle opening 36, the passage 34 and the opening 37. In order further to regulate the lubricant level within the baffles about the axle gear, a pair of slots 39 is formed in each of the baffles 26 and 27, and the metal which is punched out of the baffles to form these slots is bent downwardly to provide closure flaps 40. These closure flaps may be bent to different angles to regulate the size of the slot openings 39 and to regulate the amount of lubricant within the gear casing between the baffles.

As the gear 11 rotates, a certain amount of oil remains on the gear teeth to lubricate the same, and some of this is thrown off by centrifugal force into the surrounding gear casing and a certain amount is thrown out from between the meshing gear teeth 12 and the teeth 15 of the idler gear 16 against the sides of the gear casing. A collecting channel 41 is arranged to collect this lubricant and is secured to the gear casing wall 38 and extends along this wall from adjacent the upper portion of the gear 11 and slightly below the point of engagement of the gear 11 and the gear 16 to adjacent the lower portion of the pinion driving gear 13. A baffle 42 is arranged to extend around the major portion of the pinion gear 13 adjacent the outer periphery of the teeth 14 thereof and communicates with the collecting channel 41 through an opening 43. In this manner, lubricant which is thrown from the gears 11 and 16 is collected in the channel 41 and drained to adjacent the teeth of the pinion driving gear within the baffle 42. As shown in Fig. 4, the baffle 42 also is provided with a plurality of ribs 44 formed on the inner surface thereof for assisting in retaining lubricant about this gear. In this manner, adequate lubricant is assured to all of the gear teeth engaging surfaces of all of the gears during operation.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. A gear drive including a pair of gears arranged one higher than the other and in driving relationship with each other, a gear casing arranged about said gears to provide a lubricant reservoir, a baffle arranged in said casing adjacent a part of the outer periphery of the lower of said gears for cooperating therewith on rotation thereof to pump lubricant from said casing portion within said baffle into the adjacent portion of said casing, an opening in said baffle, means for regulating the flow of lubricant pumped by said gear and for regulating the lubricant level within said baffle, a baffle arrangement extending about a portion of the outer periphery of the higher of said gears, and means including a collecting channel arranged on the inner side of said casing for collecting lubricant thrown from said gears and draining the collected lubricant into said baffle arrangement about said higher of said gears for supplying lubricant thereto.

2. A gear drive including a driving gear, a driven gear arranged to be driven by said driving gear, a gear casing arranged about said gears to provide a lubricant reservoir, means including a baffle arrangement within said casing adjacent a part of the outer periphery of one of said gears for cooperating therewith on rotation thereof to pump lubricant from said casing portion within said baffle into the adjacent portion of said casing, means including an opening in said baffle arrangement for regulating the flow of lubricant pumped by said gear and for regulating the lubricant level within said baffle, and means arranged on an inner side of said casing for collecting lubricant thrown from said gears and for draining the collected lubricant to adjacent the other of said gears for supplying lubricant thereto.

3. A gear drive including a driving gear, a driven gear arranged to be driven by said driving gear, a gear casing arranged about said gears to provide a lubricant reservoir, means including a baffle arrangement within said casing adjacent a part of the outer periphery of one of said gears and extending to the sides of said casing for cooperating with said one of said gears on rotation thereof to pump lubricant from said casing portion within said baffle into the adjacent portion of said casing, means including an opening in said baffle arrangement for regulating the flow of lubricant pumped by said gear and for regulating the lubricant level within said baffle, means including a passageway for returning lubricant from said adjacent portion of said casing to the portion thereof within said baffle, means including a baffle arrangement extending about a portion of the outer periphery of the other of said gears, and means including a collecting channel arranged on an inner side of said casing for collecting lubricant thrown from said gears and for draining the collected lubricant into said baffle arrangement about said other of said gears for supplying lubricant thereto.

4. A gear drive including a pinion driving gear, a driven gear, an idler gear arranged in driven and driving engagement with said driving and driven gears respectively, a gear casing arranged about said gears to provide a lubricant reservoir, means including a baffle arrangement within said casing adjacent a part of the outer periphery of said driven gear and extending to the sides of said casing for cooperating with said driven gear on rotation thereof to pump lubricant from said casing portion within said baffle into the adjacent portion of said casing, means for regulating the flow of lubricant pumped by said gear and for regulating the lubricant level within said baffle, means including a passageway for returning lubricant from said adjacent portion of said casing to the portion thereof within said baffle, means including a baffle arrangement extending about a portion of the outer periphery of said driving gear, and means including a collecting channel arranged on an inner side of said casing for collecting lubricant thrown from said gears and draining the collected lubricant into said baffle arrangement about said driving gear for supplying lubricant thereto.

5. A gear drive including a driving gear, a driven gear arranged to be driven by said driving gear, a gear casing arranged about said gears to provide a lubricant reservoir, means including a baffle arrangement within said casing adjacent a part of the outer periphery of one of said gears and extending about the sides of said casing for cooperating with said one of said gears on rotation thereof to pump lubricant from said casing portion within said baffle into the adjacent portion of said casing, means including an opening in said baffle arrangement with a flap closure for regulating the flow of lubricant pumped by said gear and for regulating the lubricant level thereabout, means including a passageway for returning lubricant from said adjacent portion of said casing to the portion thereof within said baffle, means including a baffle arrangement extending about a portion of the outer periphery of the other of said gears, and means including a collecting channel arranged on an inner side of said casing for collecting lubricant thrown from said gears and draining the collected lubricant into said baffle arrangement about said other of said gears for supplying lubricant thereto.

FRANKLIN H. PRITCHARD.